Dec. 5, 1939.

A. NOVOTNY

PACKING MACHINE

Original Filed Feb. 23, 1935

9 Sheets-Sheet 1

Inventor
Anton Novotny

By Gerald F. Baldwin

Attorney

Dec. 5, 1939. A. NOVOTNY Re. 21,288

PACKING MACHINE

Original Filed Feb. 23, 1935 9 Sheets-Sheet 2

INVENTOR.
Anton Novotny
BY
Grace J. Baldwin
ATTORNEY.

Dec. 5, 1939. A. NOVOTNY Re. 21,288

PACKING MACHINE

Original Filed Feb. 23, 1935 9 Sheets-Sheet 3

INVENTOR.
Anton Novotny
BY
Crawford Baldwin
ATTORNEY.

Dec. 5, 1939. A. NOVOTNY Re. 21,288

PACKING MACHINE

Original Filed Feb. 23, 1935 9 Sheets-Sheet 4

INVENTOR.
Anton Novotny
BY
George S. Baldwin
ATTORNEY.

Dec. 5, 1939. A. NOVOTNY Re. 21,288

PACKING MACHINE

Original Filed Feb. 23, 1935 9 Sheets-Sheet 5

INVENTOR.
Anton Novotny
BY
Gerald J. Baldwin
ATTORNEY.

Dec. 5, 1939. A. NOVOTNY Re. 21,288

PACKING MACHINE

Original Filed Feb. 23, 1935 9 Sheets-Sheet 6

INVENTOR.
Anton Novotny

BY Grant F. Baldwin

ATTORNEY.

Dec. 5, 1939. A. NOVOTNY Re. 21,288

PACKING MACHINE

Original Filed Feb. 23, 1935 9 Sheets-Sheet 7

INVENTOR.
Anton Novotny

BY Gerald J. Baldwin
ATTORNEY.

Dec. 5, 1939. A. NOVOTNY Re. 21,288

PACKING MACHINE

Original Filed Feb. 23, 1935 9 Sheets-Sheet 8

INVENTOR.
Anton Novotny
BY
Geo. W. Baldwin
ATTORNEY.

Dec. 5, 1939. A. NOVOTNY Re. 21,288

PACKING MACHINE

Original Filed Feb. 23, 1935 9 Sheets-Sheet 9

INVENTOR.
Anton Novotny
BY
Geraldd Baldwin
ATTORNEY.

UNITED STATES PATENT OFFICE 21,288

PACKING MACHINE

Anton Novotny, Detroit, Mich., assignor, by mesne assignments, to Standard-Knapp Corporation, Long Island City, N. Y., a corporation of New York Original No. 2,102,640, dated December 21, 1937, Serial No. 7,739, February 23, 1935. Application for reissue May 20, 1938, Serial No. 209,073

30 Claims. (Cl. 226—14)

This invention relates to improvements in packing machines, and refers more particularly to such a mechanism for depositing packages into shipping cases.

It is an object of the invention to provide a packing mechanism wherein a plurality of packages are moved into position opposite a chute, and are automatically discharged onto a platform beside the chute as soon as a predetermined number of packages are opposite the platform; and wherein the movement of the packages onto the platform discharges others thereupon into the chute.

Another object of the invention is to provide such a packing mechanism with means for preventing the functioning of the mechanism by which the packages are discharged onto the platform unless there is a shipping case beneath the chute to receive the other packages to be discharged into it.

A further object of the invention is to provide a packing mechanism comprising a conveyor and feed members adjacent thereto by which packages are passed along the conveyor towards that portion of the latter across which a slide operates to transfer the packages towards a chute when the slide is not in operation; and wherein the feed members function as stops to prevent the passage of packages past them during the movement of the slide.

Another object of the invention is to provide a packing machine wherein a slide operates transversely of a conveyor to move packages upon the latter onto a platform so that other packages already thereupon are moved by the first named packages over a chute; and wherein a yoke operates with the slide and is provided with contact members which support and steady the other packages being moved over the chute on their sides opposite those against which pressure is exerted by the packages being delivered by the slide onto the platform. Moreover the contact members also tend to prevent the accidental movement of the other packages over the chute when the slide is not in operation.

Yet another object of the invention is to provide a packing mechanism wherein packages are delivered down a chute into shipping cases beneath them, and wherein automatic means are provided for holding vertical partitions in the shipping cases upright so that they do not interfere with the loading of packages; the automatic means being so designed and coordinated that it moves into its partition contacting position prior to delivery of the packages and is automatically withdrawn after delivery; thus the automatic means in no wise interferes with the movement of the shipping cases beneath the chute.

Having thus broadly and briefly enumerated a few of the major purposes and advantages of the invention I now proceed to describe a preferred embodiment thereof with the aid of the accompanying drawings, in which:

Figure 5 is a sectional view on the line 5—5 of Figure 2 showing the counter and coacting parts, and the arrangement on the lower conveyor for rendering the counter control inoperative.

Figure 15 is a section on the line 15—15 of Figure 5.

Figure 16 is an enlarged partial plan view showing a modified form of partition spreader.

Figure 1:
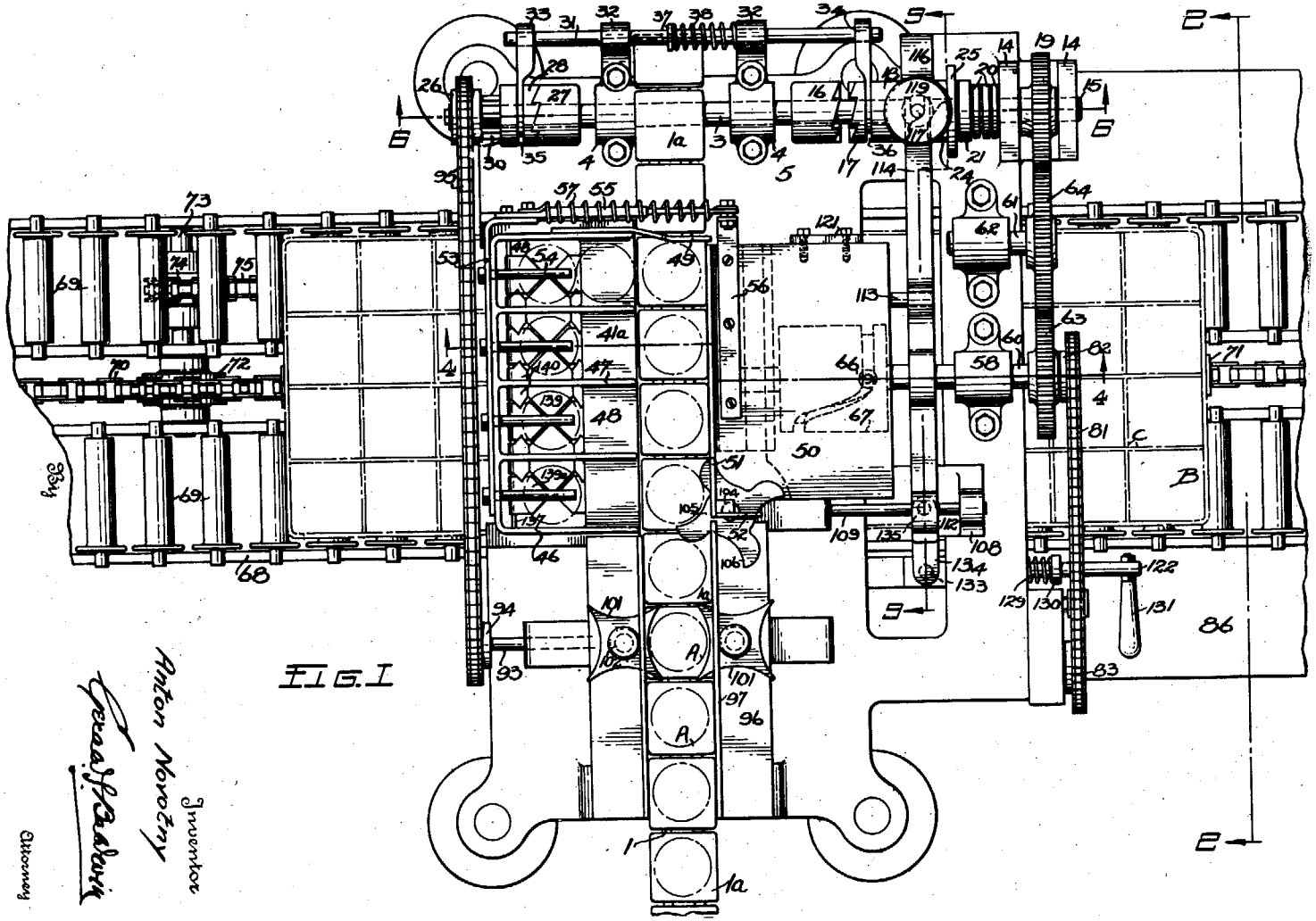
Figure 1 illustrates a plan view of the invention.
Figure 2:
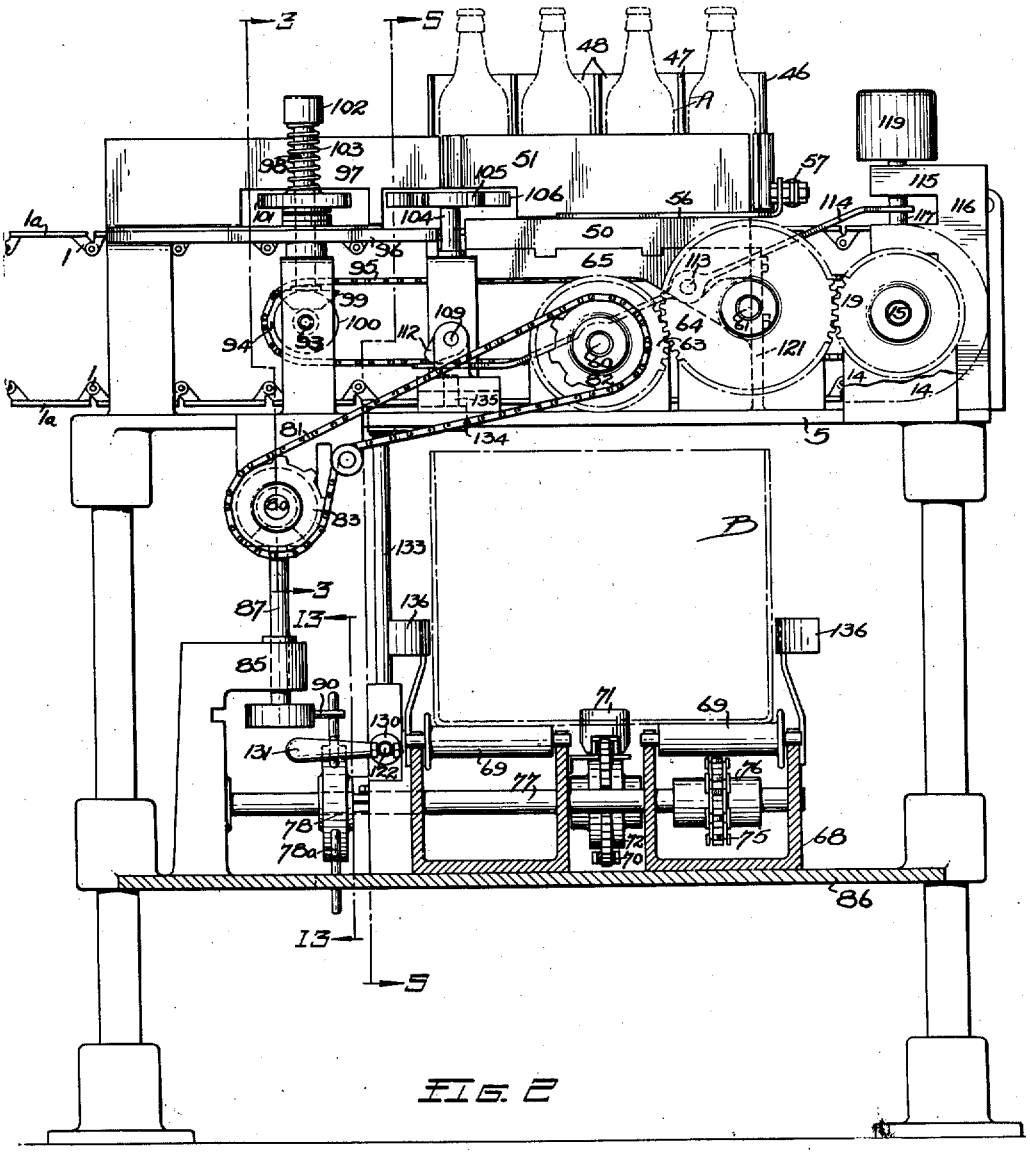
Figure 2 is a section on the line 2—2 of Figure 1.

Referring to the drawings, 1 designates a portion of a conventional conveyor chain having supporting attachments 1*a* thereon. The conveyor chain is driven from a head sprocket (not shown) and passes around a tail sprocket 2 rotated by the chain movement. The sprocket 2 is freely mounted upon a spindle 3 supported in bearings 4 provided upon a base 5. Secured to the faces of the sprocket 2 are friction discs 6 and 7. Fastened to the spindle 3 adjacent the disc 7 is a friction plate 8, and axially movable upon the said spindle adjacent the disc 6 is a second friction plate 9. Fixed around the spindle 3 adjacent the plate 9 is a flange 10. Formed in the adjacent faces of the latter and of the plate 9 are registering apertures 11 and 12 respectively each opposed pair of which house the extremities of a helical spring 13. These springs hold the friction plate 9 in contact with the disc 6 and at the same time exert sufficient pressure upon the sprocket 2 to retain the disc 7 in firm contact with the friction plate 8. Thus under normal conditions rotation of the sprocket 2 causes rotation of the spindle 3.

Mounted in bearings 14 provided upon the base 5 is a second spindle 15 in alignment with the spindle 3. Mounted upon adjacent extremities of the spindles 3 and 15, which are spaced from one another, are cooperating clutch parts 16 and 17 respectively. The clutch part 17, and a sleeve 18 integral with it, are axially slidable upon the second spindle 15. Between the bearings 14 a gear 19 is secured around the spindle 15, and arranged around the latter between the sleeve 18 and the adjacent bearing 14 is a thrust ring assembly 20. Resting against the latter is a collar 21 having openings formed therein parallel with its axis to receive springs 22 the opposite extremities of which extend into openings 23 formed in the adjacent face of the sleeve 18. Thus the springs 22 tend to force the sleeve 18 and clutch part 17 from the position shown in Figure 6 to that shown in Figure 7; that is they tend to force the clutch part 17 into engagement with the clutch part 16. Upon the periphery of the sleeve 18 is a cam 24; and integral with the said sleeve a flange 25 is provided around the sleeve extremity adjacent the collar 21. The purpose and operation of the cam 24 and flange 25 is hereinafter set forth.

Figure 6:
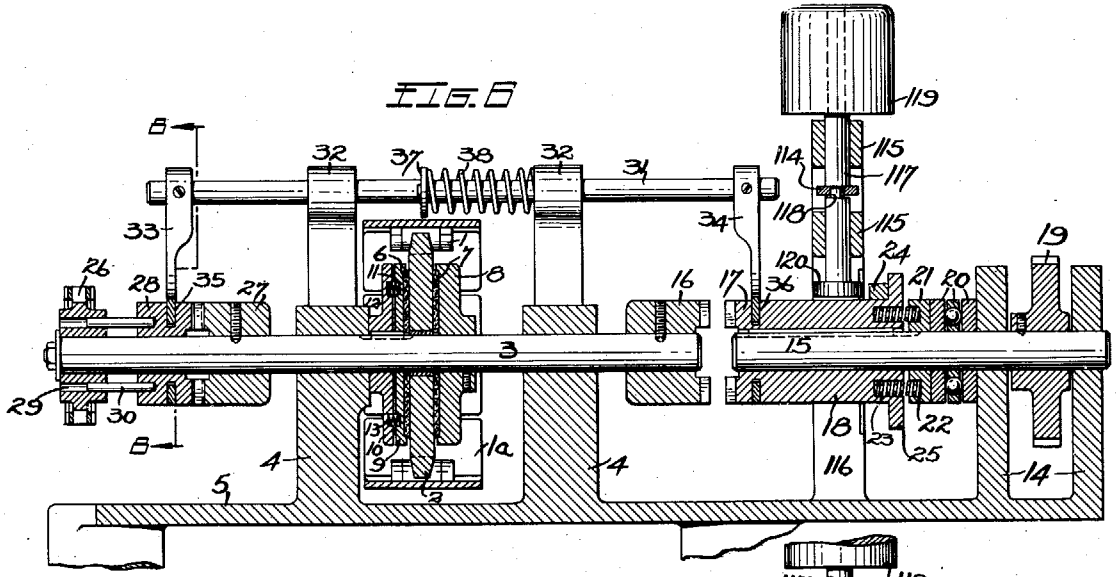
Figure 6 is an enlarged section on the line 6—6 of Figure 1.
Figure 7:
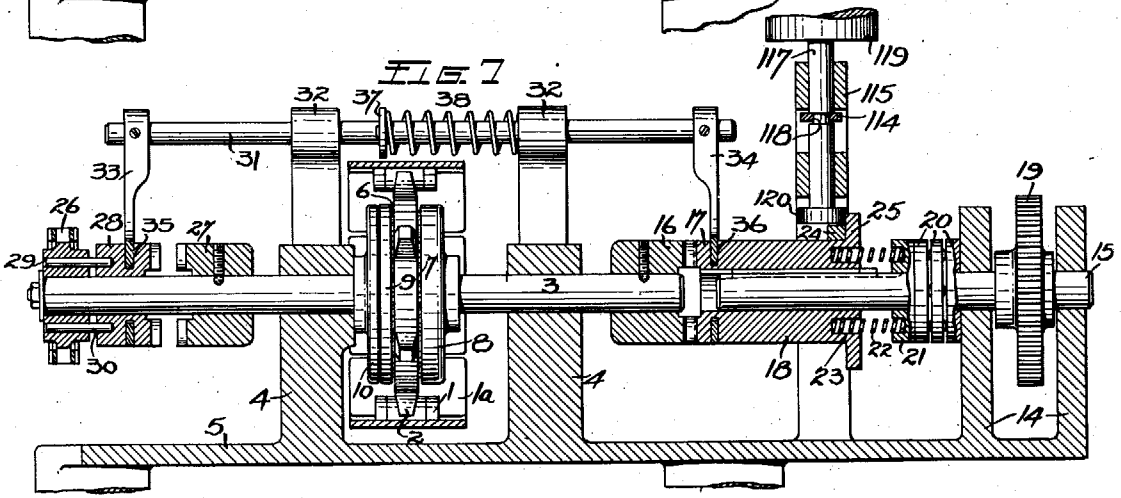
Figure 7 is an enlarged sectional view similar to Figure 6 but with the other cooperating clutch parts engaged.
Figure 8:
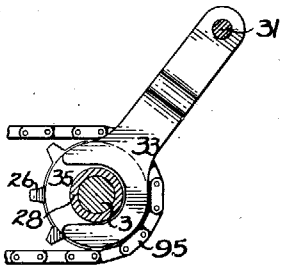
Figure 8 is a section on the line 8—8 of Figure 6.

Freely mounted on the extremity of the spindle 3 remote from the spindle 15 is a sprocket wheel 26 having a plurality of openings formed therethrough parallel with the spindle axis. Fixed on the spindle 3 is a clutch plate 27, and freely mounted and axially movable along the said spindle is a second and cooperating clutch plate 28. Projecting laterally from the latter are a plurality of drive pins 30 which extend into the sprocket openings 29 so that when the clutch plates 27 and 28 are in engagement, as shown in Figure 6, rotation of the spindle 3 causes rotation of the sprocket 26 through the said clutch plates and the driving pins 30. Obviously when the clutch plates 27 and 28 are disengaged, as shown in Figure 7, the plate 28 and the sprocket 26 remain stationary.

31 denotes a shaft parallel with the spindle 3 and supported in bearings 32 for axial movement. Secured towards the extremities of the shaft 31 are shifter yokes 33 and 34 which engage circular grooves 35 and 36 formed in the clutch plate 28 and sleeve 18 respectively. The engagement of the clutch parts 16 and 17 can only occur as and when the clutch plates 27 and 28 are disengaged and vice versa. Secured around the shaft 31 between the bearings 32 is a washer 37, and between one of the bearings 32 and the washer a spring 38 is provided which urges the shaft 31 axially in the direction to disengage the clutch plates 27 and 28 and move the clutch parts 16 and 17 into engagement.

A rest 39 is provided upon the base 5, and is, in the present instance formed integral with the latter. The upper face of the rest is longitudinally slotted throughout its entire length as shown at 40; and through this slot the upper side of the conveyor chain 1 extends. Mounted upon the top of the rest 39 on opposite sides of the slot 40 are a guide 41 and a platform 41*a*, the upper surfaces of which are in horizontal alignment. Formed in the adjacent edge faces of the guide 41 and platform 41*a* are ways 42 to receive and guide the conveyor supporting attachments 1*a*, the tops of which are substantially in alignment with the upper surfaces of the said guide and platform.

A chute 43, which in the present instance is also integral with the base 5 and rest 39, is positioned parallel with the conveyor chain 1 and spaced therefrom. This chute is enclosed by vertical walls and is divided into a plurality of compartments 44 by vertical partitions 45 extending at right angles to the conveyor chain. A pen 46 is provided upon the top of the chute 43 and constitutes an upward extension thereof. The rear and end walls of the pen coincide with the rear and end walls of the chute 43, but the pen end walls also project forwardly over the platform 41*a* and terminate adjacent the conveyor chain 1. The side of the pen adjacent the conveyor is also open. Vertical partitions 47 formed integral with the pen 46 also extend forwardly from its rear wall and coincide with the chute partitions 45; these partitions 47 however also extend over the platform 41*a* and terminate adjacent the conveyor chain 1. Thus the pen is divided into compartments 48 the rear portions of which coincide with the chute compartments 44. A bumper 49 is secured to, and extends laterally from, the end wall of the pen 46 adjacent the tail sprocket 2 and projects across the conveyor chain 1 to limit the travel of packages A thereupon.

Mounted for transverse reciprocation upon the guide 41 and supported also upon a rear guide 65 is a slide 50 having a vertical pusher 51 thereon which normally rests adjacent and parallel with the conveyor chain 1. The rear guide 65 is, in the present instance, secured to a bracket 121 which extends upwardly from, and may be formed integral with, the base 5. 52 denotes a laterally disposed stop extending from the extremity of the pusher 51 remote from the tail sprocket 2 so that when the slide is moved across the conveyor chain in a manner hereinafter described the stop positively prevents the delivery of packages upon the conveyor past the stop.

Behind the rear wall of the pen 46 a yoke 53 is provided from which a plurality of contact members 54 extend forwardly through openings formed in the rear pen wall, one substantially centrally of each pen compartment 48. Projecting laterally from the extremity of the yoke 53 adjacent the tail sprocket 2 is a telescopic arm 55 the opposite end of which is secured to a brace 56 carried by the slide 50. A spring 57 connecting the extremities of the arm 55 regulates the length of the latter, and permits the yoke 53 and members 54 to move rearwardly by permitting elongation of the telescopic arm if undue pressure is exerted against the said members 54.

Rotatably supported in suitable bearings 58 and 59 provided upon the base 5 is a shaft 60. Between the said shaft and the spindle 15, and parallel with them, a stub shaft 61 is mounted in a bearing 62. Fixed upon the shaft 60 is a gear 63 driven from the gear 19 through an intermediate gear 64 upon the stub shaft 61. Extending downwardly from the slide 50 through a slot 65a formed in the rear guide 65 is a pin 66 which engages a groove formed in a cam 67 mounted upon the shaft 60. Thus rotation of the cam 67 causes transverse reciprocation of the slide 50 through the pin 66.

A second conveyor 68 mounted upon a subbase 86 is spaced beneath the base 5 and passes under the chute 43. In the present instance this conveyor 68 is provided with a plurality of rollers 69 arranged in pairs on opposite sides of a chain 70 having spaced upwardly projecting carriers 71 thereon. The chain 70 intermediately of its length passes over and is driven by a head sprocket 72 mounted upon a shaft 73 which also has another sprocket 74 thereon, and at its extremities the chain 70 passes around conventional tail sprockets (not shown). The sprocket 74 is driven through a chain 75 from a sprocket 76 mounted upon a shaft 77 which extends laterally beyond the conveyor and has a wheel 78 thereon from which a plurality of spokes 78a, 78b and 78c radiate. It will be noted that the spokes 78b and 78c are disposed at greater angularity to one another than the spokes 78a. Moreover the spokes 78b and 78c are each spaced at the same inclination to its adjacent spoke 78a as the latter are from one another for a purpose hereinafter set forth.

Figure 13:
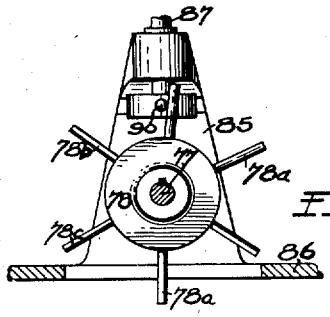
Figure 13 is a section on the line 13—13 of Figure 2.
Figure 3:
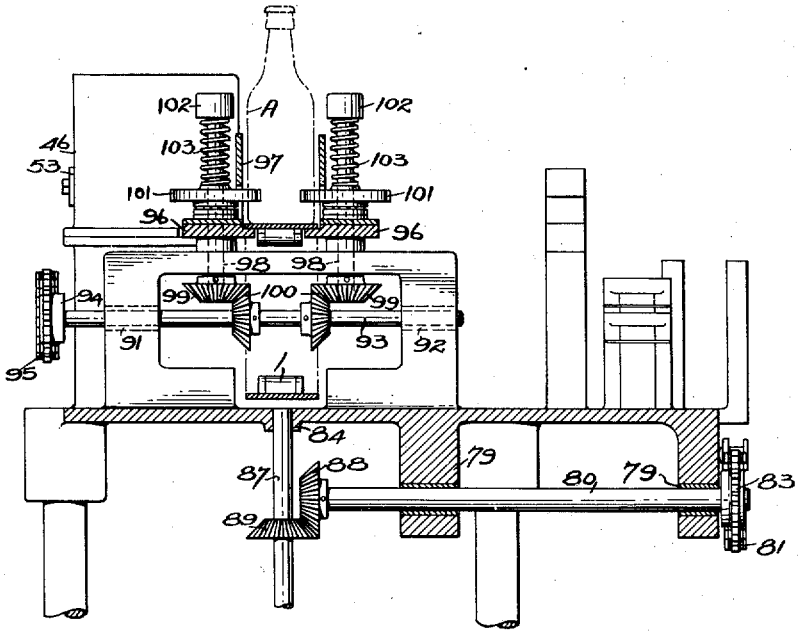
Figure 3 is a sectional view on the line 3—3 of Figure 2 showing the feed member arrangement and a portion of the drive for the lower conveyor.
Figure 4:
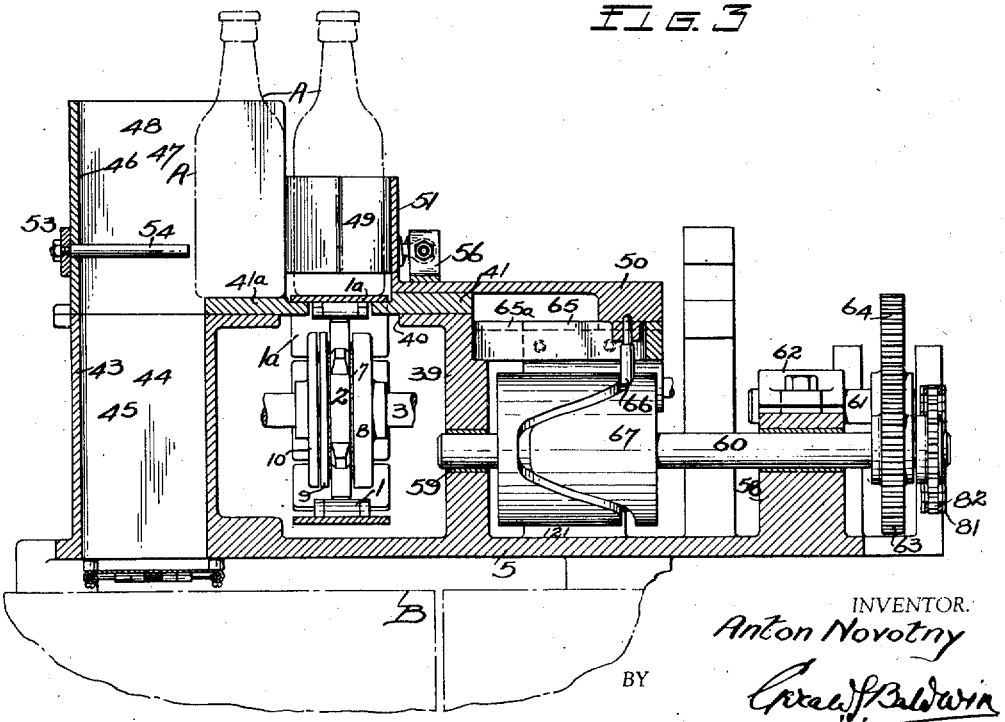
Figure 4 is an enlarged sectional view on the line 4—4 of Figure 1 showing the counter control for the slide mechanism.
Figure 9:
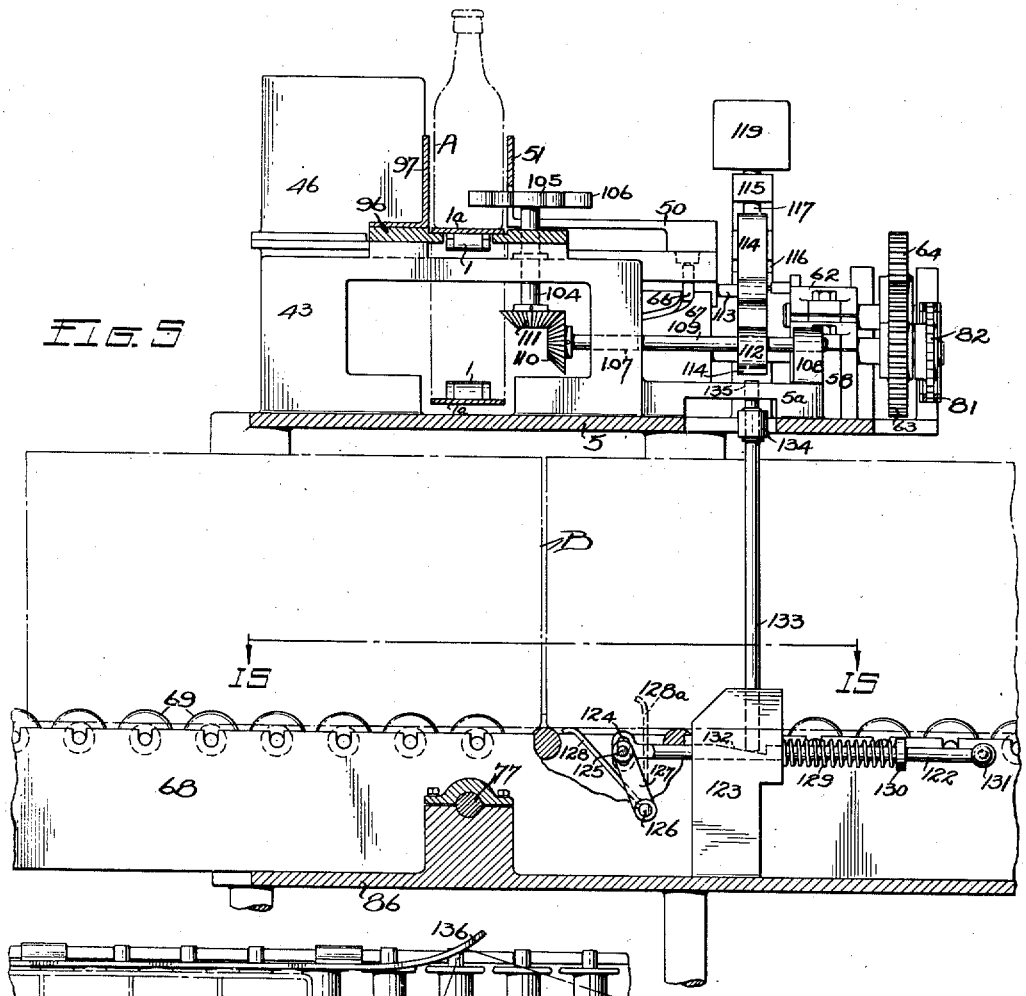
Figure 9 is an enlarged section on the line 9—9 of Figure 1.

Mounted in bearings 79 depending from the base 5 is a horizontal shaft 80 which is suitably driven from the cam shaft 60 through a chain 81 and sprockets 82 and 83 mounted upon the shafts 60 and 80 respectively. Rotatably supported in a bearing 84 upon the base 5 and in a second bearing 85 provided upon the subbase 86 is a vertical spindle 87. The latter is driven through bevel gears 88 and 89 upon the shaft 80 and spindle 87 respectively. Provided upon the lower extremity of the latter is a radial trip 90. Each spoke 78a, 78b and 78c is contacted successively by the trip 90 when the spindle 87 turns, so that each revolution of the said spindle causes partial rotation of the shaft 77 and advances the chain 70 a predetermined distance. As viewed from Figure 13 the wheel 78 turns in a clockwise direction, and, owing to the greater spacing of the spokes 78b and 78c from one another, the wheel is turned through a greater angle when the spoke 78c is engaged by the trip 90.

Packing or shipping cases B are placed upon the lower conveyor, and are moved by the carriers 71 beneath the chute 43 for filling. The carriers are so spaced that each case follows closely behind the one ahead of it. The shipping cases are usually divided into vertical compartments by partitions C, and the length of travel of the chain 70 each time the spindle 87 is turned is such that at the completion of each chain movement another row of compartments is positioned squarely beneath the chute compartments 44. It will also be noted that it is necessary to move the chain 70 a greater distance after the last row of compartments in each case has been filled to compensate for the greater distance from the transverse center line through the last row of compartments in one case to the transverse center line through the first row in the next case, which occurs due to the two thicknesses of the end walls of the two cases plus any slight spacing there may be between the two cases. For that reason greater travel is provided when the spoke 78c is moved by the trip 90. It will also be noted that the total number of spokes 78a, 78b and 78c must be equal to the number of transverse rows of compartments in the shipping cases B.

Supported in bearings 91 and 92 upon the base 5 is a horizontal shaft 93 which extends between the upper and lower portions of the conveyor chain 1 and has a sprocket 94 mounted upon one extremity. The latter is driven from the sprocket 26 by a chain 95. 96 denotes runways for the conveyor supporting attachments 1a prior to their reaching the guide 41 and platform 41a. Upwardly from the runways 96 retaining walls 97 extend adjacent the margins of the supporting attachments 1a to prevent packages upon the latter from spilling. Mounted upon outwardly projecting portions of these runways and extending vertically therethrough are opposed spindles 98 each of which has a bevel gear 99 on its lower extremity which meshes with a bevel gear 100 upon the shaft 93. These bevel gears 99 and 100 are so arranged that the spindles 98 rotate in opposite directions. Loosely mounted upon the spindles 98 are opposed feed members 101 which project through apertures formed in the walls 97 and extend partly over the conveyor supporting attachments 1a.

The peripheries of the members 101 are so formed that as they are turned in opposite directions packages A being transported by the conveyor are engaged between them and advanced towards the tail sprocket 2. At the upper extremities of the spindles 98 nuts 102 are provided and between the latter and the feed members helical springs 103 are arranged. Through the latter friction is exerted upon the members so that packages engaged between them are advanced when the spindles 98 are rotated. The frictional engagement of these springs, however, is such that in the event that other packages already occupy the entire space upon the conveyor supporting attachments 1a between the members 101 and the bumper 49, the feed members will remain stationary and not force other packages onto the already fully occupied portion of the conveyor and damage some of the packages in so doing. The frictional grip of the springs 103 however is sufficient to prevent rotation of the members 101 by packages travelling with and upon the conveyor when the spindles 98 are not turning; so that then the members 101 function as stops for the packages.

Extending through the runway 96 immediately in front of the slide 50, and rotatably mounted in the guide 41 and rest 39, is a vertical spindle 104 having a counter 105 thereon having radial arms 106 so positioned that each time a package upon the conveyor passes the counter is turned through a portion of a revolution. Mounted in suitable bearings 107 and 108 upon the base 5 is a shaft 109 having a gear 110 thereon which meshes with a gear 111 on the vertical spindle 104. The gearing 110 and 111 and the number of radial arms 106 upon the counter are so proportioned that the shaft 109 has completed one revolution when the number of packages which have passed the counter is equal to the number of compartments 48 in the pen 46. In other words each time the shaft 109 has completed one revolution there is a package opposite each of the compartments 48.

Fixed on the shaft 109 is a cam 112. Pivotally mounted upon a pin 113 projecting from the guide extension 65 is a lever 114 one extremity of which projects beneath the cam 112 and is adapted to be depressed thereby.

Vertically movable in spaced bearings 115 carried by a bracket 116 upon the base 5 is an actuating rod 117 around which an annular groove 118 is formed intermediately of its length. The extremity of the lever 114 remote from the cam 112 is bifurcated and engages the groove 118 so that pivotal movement of the lever moves the rod 117 vertically. A weight 119 is provided upon the upper extremity of the rod 117, and a disc-like element 120 is arranged on its lower extremity.

The element 120 is normally held down upon the periphery of the sleeve 18 and against the wide portion of the sleeve cam 24, as shown in Figure 6, by the weight 119. However as soon as the shaft 109 has been turned through one complete revolution by rotation of the counter 105, the cam 112 moves the lever 114 pivotally and raises the rod 117. Then the cam 24 is disengaged and the springs 22 and 38 move the clutch parts 16 and 17 into engagement, at which time the clutch plates 27 and 28 are disengaged through the shifters 33 and 34.

Rotation is then imparted to the spindle 15 by the tail sprocket 2 and spindle 3. Then the cam shaft 60, and through it the shaft 80 are rotated through the gear 19. The shaft 80 advances the conveyor chain 70 and the shipping cases B thereon in the manner already described; and due to the formation of the cam 67 upon the shaft 60, movement of the slide 50 does not occur until the said conveyor chain 70 has completed its movement. The gears 19 and 63 are of course so proportioned that one revolution of the former imparts one revolution to the latter. Further after a shipping case B has again been correctly positioned beneath the chute 43 packages A upon the conveyor attachments 1*a* opposite the slide 50 are moved by the latter onto the platform 41*a*, and other packages already upon the platform are moved by the first packages over the chute 43. Meanwhile, as already stated, movement of the slide 50 also results in corresponding movement of the contact members 54, so that the packages being moved over the chute are supported between the said members 54 and the packages just leaving the conveyor so that they are thus held vertical.

As soon as the counter 105 is again turned by the next passing package, which usually occurs as soon as the slide 50 has returned to its normal position and the passage of the package is no longer obstructed by the stop 52, the cam 112 is rotated sufficiently to allow the extremity of the lever 114 beneath it to rise, and for the element 120 to drop onto the periphery of the sleeve 18. Then as the latter continues to rotate, the element 120 contacts the inclined edge face 24*a* of the cam 24 and moves the sleeve axially against the tension of the springs 22 and 38, thereby disengaging the coupling parts 16 and 17 and re-engaging the coupling plates 27 and 28 through the shifters 33 and 34. The collar 25 limits the inward movement of the clutch part 17 by contact of the disc-like element 120 therewith when the latter is raised.

The alternating arrangement already described, whereby the sprocket 26 or the gear 19 is turned, is provided so that when the cam 67 is not being actuated and the slide 50 is in the position shown in Figures 1 and 5, some of the packages A are fed towards the extremity of the conveyor across which the slide 50 travels by the rotary feed members 101. However as soon as the cam 67 commences to turn rotation of the feed members 101 ceases and no more packages may pass them.

Figure 10:
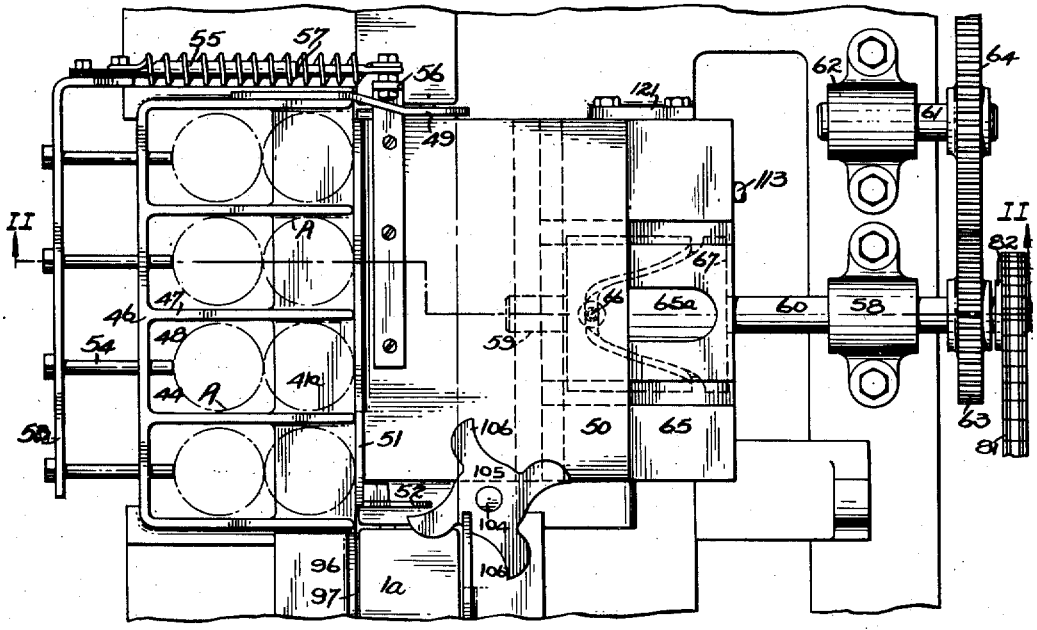
Figure 10 is an enlarged partial plan view showing the slide in advanced position.
Figure 9:
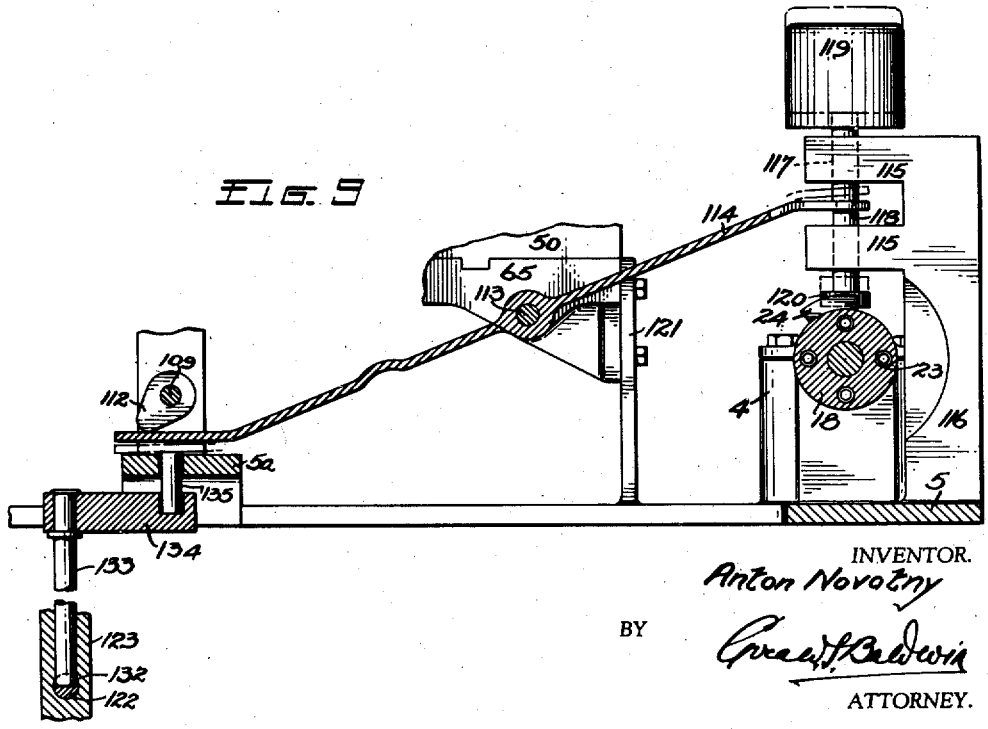

The stop 52 upon the slide 50 prevents any packages A which may have passed the feed members 101 prior to the commencement of rotation of the cam 67, passing until the slide has returned to its initial position shown in Figure 1. This stop is preferably so positioned relative to the counter 105 that rotation of the latter cannot occur when the slide is in the position shown in Figures 10 and 11. It will however be seen that rotation of the counter is anticipated prior to the completion of one revolution of the cam shaft 60 and must occur to halt the reciprocation of the slide and the intermittent movement of the lower conveyor. Disengagement of the clutch parts 16 and 17 and re-engagement of the clutch plates 27 and 28, only occurs through engagement of the element 120 with the cam 24 upon completion of one revolution of the spindle 15, and this occurs only after disengagement of the lever 114 by the cam 112 so that the actuating rod 115 has dropped to its bottom position.

Figure 14:
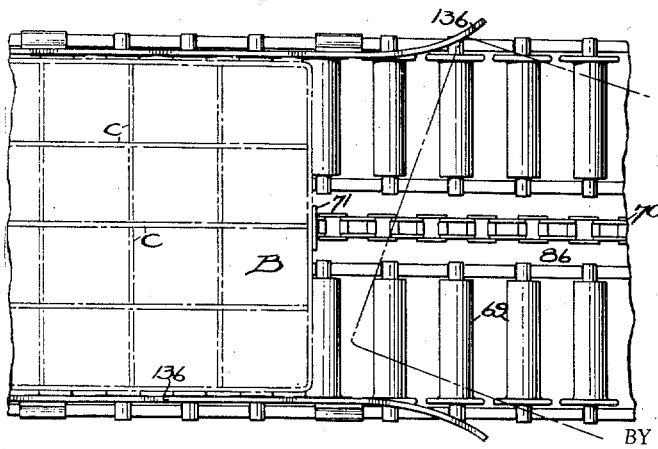
Figure 14 is a partial plan of the lower conveyor.

In order to prevent the cam 112 moving to its bottom position and turning the lever 114 so that movement of the slide 50 and conveyor chain 70 results when no shipping case is in position beneath the chute 43 a safety lock is provided, which is shown in Figures 5, 14 and 15. A horizontal rod 122 is axially slidable in a bearing 123 provided upon the subbase 86. One extremity of the rod 122 is provided with a vertically elongated slot 124 through which a coupling pin 125 extends. Rotatably mounted transversely of the conveyor 68 is a shaft 126 on one extremity of which an arm 127 is secured. Through the outer extremity of this arm the pin 125 extends; and fixed on the shaft 126 on one side of the conveyor chain 70 and adjacent thereto is an element 128. Around the rod 122 on the other side of the bearing 123, a spring 129 is arranged which extends between the said bearing and a collar 130 fixed around the rod. This spring tends to move the latter so that the distance between the bearing and the collar is increased. Beyond the collar a suitable handle 131 is provided upon the rod to permit ready manual movement thereof.

Intermediately of the length of the rod 122 an inclined face 132 is formed on its upper side; and supported upon the face 132 is the lower extremity of a vertical rod 133 which is also supported in the bearing 123. Secured to the upper extremity of the rod 133 is an arm 134 from the upper face of which a locking pin 135 projects that is adapted to extend above the top of the base portion 5*a* through which it is vertically movable.

When the element 128 is depressed and the shaft 126 is turned, the arm 127 is moved into the position shown in Figure 5, and the rod 122 is moved axially against the tension of the spring 129. Then the vertical rod 133 rests upon the low extremity of the inclined face 132 and consequently the rod 133 is in its bottom position. At that time the top of the locking pin 135 is substantially flush with the top of the base portion 5*a* so that the lever 114 may be turned by the cam 112. As soon as a shipping case passes off the element 128 and it is no longer depressed, the spring 129 causes the horizontal rod 122 to move axially thereby raising the element to its position 128a indicated in Figure 5. During this movement of the rod 122 the inclined face 132 travels beneath the lower extremity of the vertical rod 133 and raises the latter so that the locking pin 135 moves into a position immediately beneath the lever 114 and prevents the latter being turned by the cam 112.

Consequently the passage of the required number of packages A past the counter 105 will not cause reciprocation of the slide 50 unless there is a shipping case beneath the chute 43, because the cam 112 and its shaft 109 cannot rotate when the lever 114 is held immovable by the locking pin 135. Again when the cam 112 is thus held against further rotation the counter also cannot turn, therefore there is no danger of more than the desired number of packages passing the counter between each reciprocation of the slide.

In order to hold the shipping cases B against transverse movement upon the conveyor 68 and insure the compartments in the cases passing squarely beneath the chute compartments 44 guide rails 136 are preferably provided upon the said conveyor.

Further relative to the safety lock mechanism just described, it will be noted that in the drawings the element 128 is not located directly beneath the chute 43 but somewhat on one side. It is however obvious that by lengthening the rod 122 the said element may be arranged squarely under the chute when such positioning is required.

As previously stated the shipping cases B into which the packages are packed may be provided with partitions C to divide them into separate compartments or cells, each of which is intended to receive a separate or individual, package. The cases are frequently made of relatively light, flexible material and the partitions of even lighter stock; again, the partitions are frequently only loosely arranged in the cases and are therefore to some extent movable therein. I therefore find it necessary to provide means for holding the vertical sides of the cases and/or the partitions upright and squarely positioned beneath the chute to insure proper delivery of the packages.

Figures 11, 12:
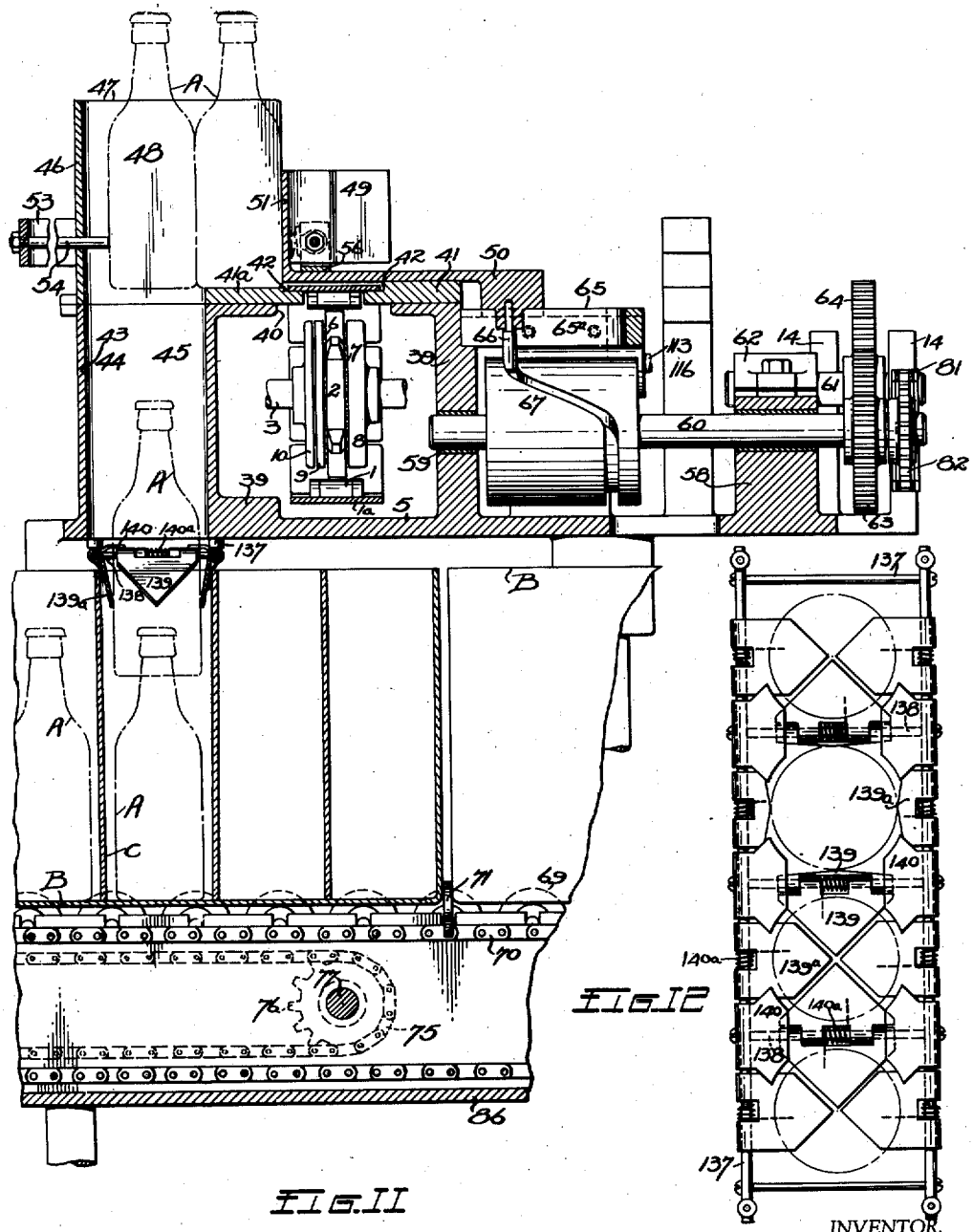
Figure 11 is a section on the line 11—11 of Figure 10.
Figure 12 is an enlarged plan of one form of partition spreader for holding the partitions in the shipping cases upright.
Figure 18:
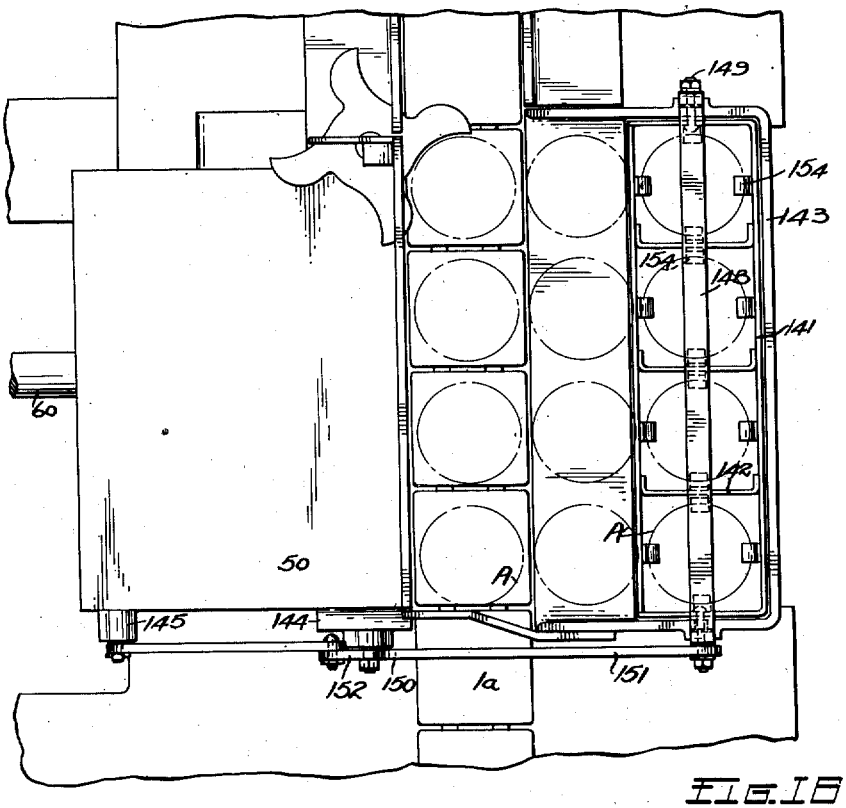
Figure 19:
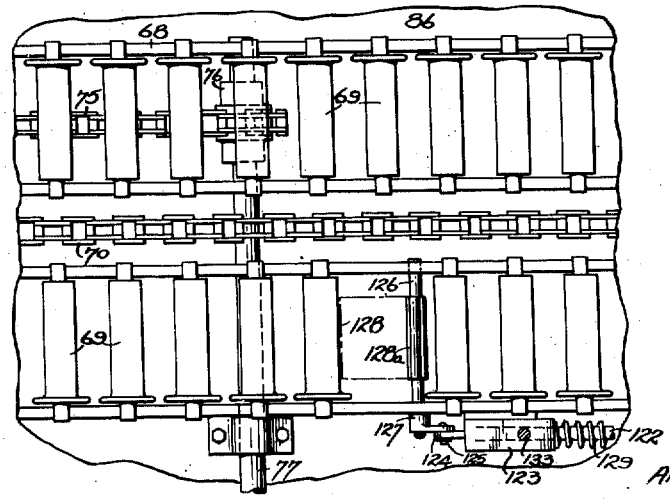

In Figures 11 and 12 an arrangement is shown for holding shipping case sides and particularly the partitions therein upright during the delivery of packages into the cases, when the partitions extend substantially to the tops of the cases. A frame 137 is secured beneath the chute 43 and is transversely divided by cross bars 138 each of which is positioned beneath one of the chute partitions 45. Pivoted upon each cross bar 138 and normally extending one towards each side are two straightening arms 139. A similar straightening arm 139a is also pivotally mounted on each longitudinal portion of the frame 137 on each side of each cross bar 138. Springs 140a normally hold the arms 139 and 139a horizontal against ears 140 fixed upon the frame. These ears are so arranged that each limits the upward swing of a plurality of straightening arms.

From Figure 11 it will be noted that each time a package is dropped down a chute compartment 44 a set of straightening arms 139 and 139a is contacted by the package and moved pivotally downwards, thereby moving the partitions C into a substantially upright position squarely beneath the chute compartment 45. Again when the arms 139 and 139a are normally horizontally disposed neither they nor the frame 137 in any way interfere with the free passage of cases B on the conveyor 68.

Figure 17:
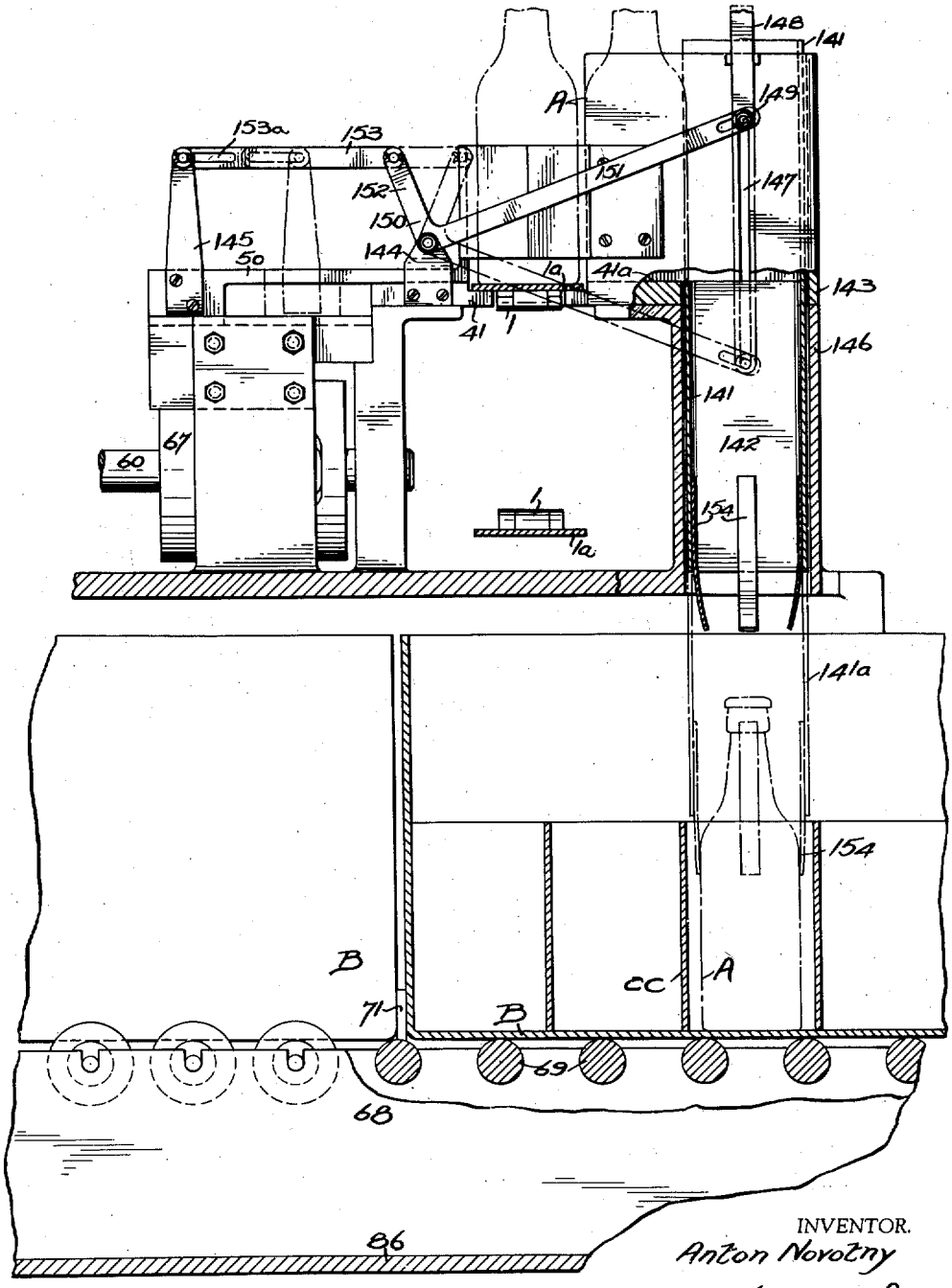
Figure 17 is a side view of Figure 16 partly in section.

In Figures 16 and 17 a modified arrangement is shown for holding the shipping case partitions substantially upright during loading and is particularly applicable when the height of the partitions is materially less than that of the sides of the shipping cases.

In this arrangement neither the chute 146 nor its upward extension or pen 143 has any partitions dividing its interior. Vertically movable in the chute 146 and pen 143 is a cage 141. The lower portion of this cage which normally rests within the chute 146 is closed on all sides, whereas the front of the upper portion of the cage normally within the pen 143 is open. The cage throughout its entire height is divided by transverse walls 142 which correspond with the chute and pen partitions 45 and 47 respectively.

Mounted upon the guide 41 and projecting upwardly therefrom adjacent one side of the slide 50 is a bearing 144, and extending upwardly from the slide is a standard 145. Formed through the end walls of the pen 143 and chute 146 are vertical slots 147. Extending outwardly from the extremities of the cage 141 through the slots 147 are pins 149. Extending across the top of the cage 141 at sufficient height to clear the top of the pen 143 when the former is lowered in a manner hereinafter set forth is a yoke 148, the downturned extremities of which are apertured for the passage of the pins 149 therethrough exteriorly of the pen.

Pivoted on the bearing 144 is a bellcrank 150 the outer extremity of one arm 151 of which is slotted for the passage of one of the pins 149 therethrough, while the outer extremity of the other arm 152 is pivoted to one extremity of a link 153. The other extremity of the latter is pivotally connected to the standard 145, and, in the present instance the link 153 is provided with a conventional lost motion connection including a slot 153a in order to shorten the length of the bellcrank arm 152. Secured to the inner faces of the cage 141 and the partitions 142 are opposed pairs of leaf springs or, blade-like fingers, 154 the free extremities of which are somewhat inwardly flexed and terminate slightly below the cage.

As the slide 50 advances and the packages A on the platform 41a are pushed over the chute 146 the bellcrank 150 is turned thereby lowering the cage 141 to its position 141a. In that lowermost position the top of cage 141 is indicated by the full line which is on a level with platform 41a.

The movement of the cage is preferably such that in its bottom position the cage is spaced above the partitions CC, Figure 17, while the springs 154 extend below the upper margins of these partitions. Thus it will be seen that as the inwardly flexed spring extremities are lowered they move into a substantially vertical position any partitions CC which are inwardly inclined and restrict the openings into the compartments which they define, and the weight of the falling packages straightens out the flexed spring extremities sufficiently for the packages to drop into their compartments.

From the foregoing description it will be seen that the conveyor 1 imparts the drive to the entire machine, so that the latter only operates when the conveyor is in use. Again since all the movements of the packing machine are actuated through the friction drive imparted to the spindle 3 from the tail sprocket 2 the entire mechanism is free to stop in case of an accident occurring such as a package A falling transversely across the platform 41a and preventing reciprocation of the slide 50 unless the package is crushed.

Again should the counter 105 be somewhat hard to turn it might act as a stop to prevent continued movement of the packages A with the conveyor 1; the feed members 102 however prevent such an occurrence because they positively move the packages with the conveyor and would exert enough pressure upon a row of packages extending between them and the counter to turn the latter under all normal conditions.

While in the foregoing the preferred embodiments of the invention have been described and shown, it is understood that the construction is susceptible to such further alterations and modifications as fall within the scope of the appended claims.

What I claim is:

1. In a mechanism of the character described, the combination of a chute open at all times for packages to drop therethrough, a slide to deliver the packages thereinto, feeding means for transporting the packages within the range of the slide, a portion of the feeding means extending between the normal position of the slide and the chute, and means for checking the movement of the packages as they are delivered to the chute by the slide.

2. In a packing mechanism, the combination of conveying means for transporting packages, a chute adjacent one side thereof and open at all times for the packages to drop therethrough, a slide normally positioned on the other side thereof opposite the chute, means reciprocating the slide across the conveying means to plow the packages off the latter, and means cooperative with the slide for checking the movement of the packages as they are delivered to the chute by the slide.

3. In a packing machine, the combination of conveying means for transporting packages, a chute open at all times for the packages to drop through on one side of the conveying means, a slide normally positioned adjacent the other side of the conveying means opposite the chute, means actuated by movement of the conveying means reciprocating the slide across the conveying means and plowing the packages off the latter, and yieldable means for checking the movement of the packages as they are transferred from the conveying means to the chute by the plowing action of the slide.

4. A packing mechanism comprising a conveyor on which packages are adapted to be transported, a chute open at all times for the packages to drop therethrough on one side of the conveyor, a stationary platform between the conveyor and the chute on which other packages are directly supported, and a slide normally positioned on the other side of the conveyor and mounted for reciprocation across the latter to push the packages thereupon onto the platform, this package movement forcing the other packages off the platform into the chute.

5. A packing mechanism comprising a chute, a slide adapted to deliver packages laterally thereinto, and means actuated by the final movement of the slide for holding the sides of a shipping case beneath the chute substantially vertical during the delivery of the packages down the chute and into the case.

6. A mechanism comprising a chute, a slide to deliver packages intermittently thereinto, means operating in alignment with the slide supporting the sides of the packages remote from said slide during its movement, a conveyor extending beneath the chute to carry shipping cases to receive the packages dropped therethrough, conveying means transporting the packages into position adjacent the slide, means controlled by the passage of the packages along the conveying means for actuating the conveyor and slide, means for stopping movement of the packages on the conveying means during operative movements of the slide, and means preventing the functioning of the conveyor and slide actuating means adapted to be released by shipping cases upon the conveyor.

7. In a mechanism of the character described, the combination of a chute, a reciprocating slide for pushing packages thereinto, means operating in alignment with the slide supporting the sides of the packages remote from said slide during its movement, a conveyor extending beneath the chute to carry shipping cases to receive the packages dropped therethrough, and means for moving the conveyor intermittently between each slide movement.

8. In a mechanism, the combination set forth in claim 7, wherein means are provided for advancing the conveyor a greater distance than usual at regular intervals after the complete filling of each shipping case.

9. A packing mechanism including a conveying means for transporting packages, a chute down which the packages drop, a slide opposite the chute mounted for reciprocation across the conveying means to plow the packages off the latter, and means moving with the slide supporting the sides of the packages remote from the slide as they move over the chute.

10. A packing mechanism including a conveying means for transporting packages, a chute, a platform between the conveying means and the chute, a slide reciprocated across the conveying means for transferring the packages from the latter onto the platform, the movement of said packages being adapted to force other packages already upon the platform over the chute, and means moving with the slide supporting said other packages during their movement over the chute.

11. A mechanism of the character described comprising a continuously travelling conveyor, a movable slide driven by the conveyor for plowing packages off a portion of the conveyor, feed members also driven by the conveyor and located adjacent another portion of said conveyor to positively move the packages upon the conveyor towards the slide, and means actuating the slide and feed members alternately.

12. A mechanism of the character described comprising a conveyor, a movable slide for plowing packages off a portion thereof, rotary means controlled by the passage of the packages onto that portion of the conveyor over which the slide operates for actuating the slide, and feed members adjacent the conveyor adapted to positively advance the packages along the conveyor to turn the rotary means.

13. A mechanism of the character described comprising a chute open at all times for packages to drop therethrough, a conveyor to carry the packages towards the chute, means for transferring the packages from the conveyor to the chute, means movable in alignment with the transfer means for steadying the packages as they are moved over the chute, a lever, means operated by the passage of the packages within the range of the transferring means for moving the lever, and means actuated by movement of the lever for moving the transferring means.

14. A mechanism of the character described, comprising a chute down which packages drop, a conveyor to carry packages towards the chute, means for transferring the packages from the conveyor to the chute, a second conveyor for intermittently positioning shipping cases beneath the chute, means controlling the operation of the first named conveyor and the package transfer means, a pivotally supported lever controlling the last named means, means for locking the lever against movement whenever a shipping case is not in position beneath the chute and thereby prevent the operation of the first named conveyor and the package transfer means, means for releasing the locking means to free the lever upon the positioning of a shipping case beneath the chute, and means for actuating the lever upon its release from the locking means to restore the first named conveyor and the package transfer means to operative condition.

15. The mechanism as set forth in claim 14, wherein the locking means for the lever is controlled by a trip member which is adapted to be actuated by a shipping case positioned beneath the chute for the release of the lever from its control of the package conveyor and the transfer means.

16. A mechanism of the character described comprising a chute down which packages drop, a conveyor to carry the packages towards the chute, means for transferring the packages from the conveyor to the chute, a lever, means operated by the passage of the packages within the range of the transfer means for moving the lever, and means actuated by movement of the lever for moving the transfer means, in combination with a second conveyor extending beneath the chute, and a trip adjacent the second conveyor normally preventing movement of the lever, said trip being adapted to be moved to release the lever by a shipping case upon the second conveyor.

17. A mechanism of the character described comprising a chute down which packages drop, a conveyor to carry the packages towards the chute, means for transferring the packages from the conveyor to the chute, a lever, means operated by the passage of the packages within the range of the transfer means for moving the lever, and means actuated by movement of the lever for moving the transfer means, in combination with a second conveyor extending beneath the chute, and means for moving said second conveyor controlled by movement of the lever.

18. In a mechanism of the character described, the combination of a travelling conveyor including a tail sprocket, a slide mounted for reciprocation across the conveyor to move packages off the latter, a rotary counter turned by the packages as they pass along upon the conveyor, means including a lever adapted to be actuated by the counter controlling actuation of the slide, other rotary means adjacent the conveyor for insuring that packages upon the conveyor move with the latter towards the counter, a spindle, and means actuated by the spindle and controlled by the lever alternately turning the rotary means and reciprocating the slide.

19. In an arrangement of the character described comprising a conveyor including a tail sprocket, a slide mounted for reciprocation across the conveyor, a chute adjacent a portion of the conveyor into which packages are delivered from the latter by the slide, a second conveyor including a driven sprocket wheel extending beneath the chute, a shaft on which the sprocket wheel is mounted, a spindle driven by the rotation of the tail sprocket of the first named conveyor, a radial trip on said spindle, and projecting members on said shaft contacted by said trip so that upon each revolution of the spindle the second conveyor is moved a predetermined distance.

20. In a mechanism of the character described, the combination of a chute open at all times for packages to drop therethrough, a slide to deliver the packages into the chute, feeding means for transporting the packages within the range of the slide, a portion of the feeding means extending between the normal position of the slide and the chute, means for checking the movement of the packages as they are delivered to the chute by the slide, and means automatically engaging the sides of shipping cases beneath the chute and holding them substantially vertical during delivery of the packages through the chute.

21. In a mechanism of the character described, the combination of a chute open at all times for packages to drop therethrough, a slide to deliver the packages into the chute, feeding means for transporting the packages within the range of the slide, a portion of the feeding means extending between the normal position of the slide and the chute, means for checking the movement of the packages as they are delivered to the chute by the slide, and means automatically engaging the sides of shipping cases beneath the chute and holding them substantially vertical during delivery of the packages through the chute, said automatic means normally resting entirely above said cases to permit their passage beneath the chute.

22. In a mechanism of the character described, the combination of a chute, a cage vertically movable therein, a slide adapted to feed packages into the chute, a conveyor carrying shipping cases to loading position beneath the chute, and means actuated by the final movement of the slide for moving the cage vertically to engage the sides of the shipping cases and hold them substantially vertical during the delivery of the packages down the chute into the cases.

23. In a mechanism of the character described, the combination of a travelling conveyor including a tail sprocket, a slide mounted for reciprocation across the conveyor to move packages off the latter, a rotary counter turned by the passage of packages along the conveyor, means including a lever adapted to be actuated by the counter controlling actuation of the slide, a spindle, and means actuated by the spindle and controlled by the lever reciprocating the slide, in combination with a chute into which the packages are fed by the slide, a second conveyor passing beneath the chute, and a trip mounted upon the second conveyor for releasing the lever for movement into position to cause reciprocation of the slide.

24. In an arrangement of the character described the combination of a conveyor including a tail sprocket, a slide mounted for reciprocation across the conveyor, a chute adjacent a portion of the conveyor into which packages are delivered from the latter by the slide, a second conveyor including a driven sprocket wheel beneath the chute, a shaft on which the latter is mounted, a spindle driven by rotation of the tail sprocket, a trip on said spindle, and means on said shaft actuated by said trip whereby the second conveyor is advanced.

25. In a packing machine for packing shipping cases having subdividing partitions comprising two sets of spaced parallel flexible strips criss-crossed with respect to one another to form individual compartments for the packages to be packed, the combination of a chute for the packages to drop through into the shipping case, means for supporting the shipping case beneath the chute, means for feeding a plurality of packages into the chute, transverse walls within the chute subdividing the same into individual chutes for the individual packages, and means for squaring up the criss-crossed flexible partitions to shape the individual compartments to receive the packages comprising yieldable blade-like fingers on the side walls of the chute intermediate said transverse walls and on both sides of each of the transverse walls and extending below the lower edges of the chute, said fingers at all times projecting in the direction of movement of the packages into the case, and means for causing said fingers to simultaneously engage the said criss-crossed partitions and shift the same at right angles to one another within the shipping case.

26. In a machine for packing shipping cases having subdividing partitions of flexible material therein to form cells for receiving individual packages, an elongated chute having parallel side walls adapted to receive the packages and direct them downwardly into the case, means for supporting a shipping case beneath the chute, means for simultaneously delivering a plurality of packages into the chute, means for separating the packages from one another to correspond to the separation of the cells, transverse walls subdividing the elongated chute into a plurality of individual chutes for directing the individual packages, means for guiding the packages into their respective cells simultaneously and simultaneously therewith shifting said partitions to square up the cells to receive the packages comprising yieldable fingers depending from the side walls of the chute intermediate each of said transverse walls and pairs of such fingers depending from each of said transverse walls, said fingers at all times projecting in the direction of movement of the packages into the case and adapted to engage the upper edges of the partitions, and means for causing the fingers to project within the cells.

27. In a machine for packing shipping cases having subdividing partitions of flexible material therein to form cells for receiving individual packages, an elongated chute having parallel side walls adapted to receive the packages and direct them downwardly into the case, means for supporting a shipping case beneath the chute, means for simultaneously delivering a plurality of packages into the chute, means for separating the packages from one another to correspond to the separation of the cells, transverse walls subdividing the elongated chute into a plurality of individual chutes for directing the individual packages, and means for guiding the packages into their respective cells simultaneously and simultaneously therewith shifting said partitions to square up the cells to receive the packages comprising pairs of yieldable fingers depending from each of said transverse walls and at all times projecting in the direction of movement of the packages into the case, each of said pairs of fingers operating upon a partition between two adjacent cells to shift said partition correctly for the two packages descending simultaneously on the opposite sides of said partition, and means for causing the fingers to project within the cells.

28. In a machine for packing shipping cases having subdividing partitions of flexible material therein to form cells for receiving individual packages, a row of chutes having separating walls between them and adapted to receive individual packages and direct them downwardly into the case, means for supporting a shipping case beneath the same, means for simultaneously delivering packages into said respective chutes, means for guiding the packages into their respective cells simultaneously and simultaneously therewith shifting said partitions to square up the cells to receive the packages comprising blade-like spring fingers depending from the side walls of the chutes and pairs of such fingers depending from each of said separating walls, said fingers projecting in the direction of movement of the packages into the case at all times and adapted to engage the upper edges of the partitions, and means for causing the fingers to project within the cells.

29. In a machine for packing shipping cases having subdividing partitions of flexible material therein to form cells for receiving individual packages, a row of chutes having separating walls between them and adapted to receive individual packages and direct them downwardly into the case, means for supporting a shipping case beneath the same, means for simultaneously delivering packages into said respective chutes, means for guiding the packages into their respective cells simultaneously and simultaneously therewith shifting said partitions to square up the cells to receive the packages comprising pairs of blade-like spring fingers depending from each of said separating walls and at all times projecting in the direction of movement of the packages into the case, each of said pairs of fingers operating upon a partition between two adjacent cells to shift said partition correctly for the two packages descending simultaneously on the opposite sides of said partition, and means for causing the fingers to project within the cells.

30. In a machine for packing shipping cases having subdividing partitions of flexible material therein to form cells for receiving individual packages, a row of passageways having separating walls between them and adapted to receive individual packages and direct them into the case, means for supporting a shipping case adjacent the end of the same to receive the packages, means for simultaneously delivering packages into said respective passageways and moving them therethrough, means for guiding the packages into their respective cells simultaneously and simultaneously therewith shifting said partitions to square up the cells to receive the packages comprising pairs of blade-like fingers projecting from the end of each of said separating walls and biased away from each other, each of said pairs of fingers operating upon a partition between two adjacent cells to shift said partition correctly for the two packages entering simultaneously on the opposite sides of said partition, and means for causing the fingers to project within the cells.

ANTON NOVOTNY.